(12) United States Patent
Holcomb

(10) Patent No.: US 6,857,830 B2
(45) Date of Patent: Feb. 22, 2005

(54) ROOF CORE CUTTER

(76) Inventor: Robert C. Holcomb, 11641 Lewis River Rd., Greenacres, WA (US) 98603

( * ) Notice: Subject to any disclaimer, the term of this patent is extended or adjusted under 35 U.S.C. 154(b) by 40 days.

(21) Appl. No.: 10/351,551

(22) Filed: Jan. 27, 2003

(65) Prior Publication Data

US 2004/0146366 A1 Jul. 29, 2004

(51) Int. Cl.$^7$ ............................................... B23B 51/04
(52) U.S. Cl. ..................... 408/204; 408/68; 408/241 B; 408/115 R
(58) Field of Search ................. 408/204, 205, 408/206, 207, 209, 703, 231, 233, 239 R, 145, 68, 97, 115 R, 241 B; 175/403, 541, 405.1; 125/20

(56) References Cited

U.S. PATENT DOCUMENTS

| | | | | |
|---|---|---|---|---|
| 958,112 | A | * | 5/1910 | Halliwell et al. ............ 408/206 |
| 2,754,864 | A | * | 7/1956 | Elsy ............................ 408/206 |
| 2,779,361 | A | * | 1/1957 | McKiff ........................ 408/204 |
| 3,559,513 | A | * | 2/1971 | Hougen ....................... 408/204 |
| 4,060,333 | A | * | 11/1977 | White .......................... 408/103 |
| 4,152,090 | A | * | 5/1979 | Harris et al. ................ 408/104 |
| 4,331,411 | A | * | 5/1982 | Kessinger et al. ............ 408/97 |
| 4,715,125 | A | * | 12/1987 | Livick ........................... 33/197 |
| 5,035,548 | A | * | 7/1991 | Pidgeon ........................ 408/68 |
| 5,082,403 | A | | 1/1992 | Sutton et al. ................. 408/68 |
| 5,096,341 | A | | 3/1992 | Despres ........................ 408/68 |
| 5,222,845 | A | * | 6/1993 | Goldstein et al. ............ 408/103 |
| 5,435,672 | A | | 7/1995 | Hall et al. ..................... 408/68 |
| 5,690,452 | A | | 11/1997 | Baublits ...................... 408/204 |
| 5,800,099 | A | * | 9/1998 | Cooper ........................ 408/1 R |
| 5,934,845 | A | | 8/1999 | Frey .............................. 408/68 |
| 6,341,925 | B1 | | 1/2002 | Despres ....................... 408/204 |
| 6,511,266 | B1 | * | 1/2003 | Groot .......................... 408/1 R |
| 6,599,063 | B1 | * | 7/2003 | Capstran ..................... 408/1 R |
| 2002/0122703 | A1 | | 9/2002 | Czyzewski et al. ......... 408/1 R |
| 2002/0131835 | A1 | | 9/2002 | Despres ...................... 408/204 |

FOREIGN PATENT DOCUMENTS

| | | | | |
|---|---|---|---|---|
| DE | 3518496 | * | 11/1986 | ............. 408/241 B |

OTHER PUBLICATIONS

Red Dragon CC501 Core Cutter; Red Dragon Roofing Torches and Equipment Catalog Nbr. 1099; p. 12.

* cited by examiner

*Primary Examiner*—Daniel W. Howell
(74) *Attorney, Agent, or Firm*—Richard C. Litman

(57) ABSTRACT

A roof core-drilling apparatus and drilling guide adapted to be used in combination with a rotary drive means in which the mandrel portion of the roof core-cutter operates not only to mechanically connect the saw body to the drive means for cutting the core, but also as a plunger for ejecting the core from the saw body when the drilling operation is completed. The core cutting guide provides a stable platform for guiding the roof core cutter during operation. The saw teeth on the outer edge of the saw body are angled to cut through the work material in such a manner as to facilitate the ejection of the core material from the saw body after the roof coring operation is complete.

3 Claims, 5 Drawing Sheets

ROOF CORE CUTTER

BACKGROUND OF THE INVENTION

1. Field of the Invention

The present invention relates to core-drilling apparatus, and in particular, to a roof core-drilling apparatus and drilling guide adapted to be used in combination with a rotary drive, in which the mandrel portion of the invention operates not only for mechanically connecting the saw body to the drive means during the drilling operation, but also as a plunger for ejecting the care of the work material from the saw cup when the drilling operation is completed.

2. Description of the Related Art

Although core cutters are well known in the prior art, core cutters specifically adapted for use in the cutting of roof cores over a few inches in length in combination with drill motors are not so well known. In hole saw operations where the core removed is less than several inches in length, saw cups with pilot bits are normally used in conjunction with a power drill. The problem faced by all core drilling devices has been the difficulty in ejecting the work material after completion of the drilling operation. When the saw cup has penetrated a distance of an inch or more, a cylindrically-shaped core of work material becomes lodged tightly within the saw cup, and in prior art hole, was difficult to remove.

Several core-drilling devices are known in which the core of the work material is ejected from the saw cup at the completion of the drilling operation. In U.S. Pat. Nos. 5,435,672, 5,690,452, and 5,934,835 a spring biases the core as the hole is being cut and automatically ejects the core from the saw after completion of the drilling operation.

The problem with these spring-loaded hole saws is the uncertainty of whether the spring bias will be sufficient to eject the core. Independent of the effect of time and weather on the properties of the spring material, different work material requires a different amount of force necessary to eject the core, and a work material of particularly "sticky" material would invariably leave the core stuck in the saw. This problem has been addressed in U.S. Pat. Nos. U.S. 5,082,403, 5,096,341 and 5,435,672, in which the mandrel-forming portion of the hole saw is threadedly received by the base of the saw cup and by rotating the mandrel in reverse of the normal drilling operation direction, the core is ejected from the saw cup. Differences in these inventions being adapted to either left-hand threaded or right-hand threaded arbor-receiving bores. U.S. Pat. No. 6,341,925 responded to a need for a plug ejecting hole saw which utilized a thin base wall and thus was not adaptable to a threaded base, however still used a threaded mandrel and a complex spring biased attachment bore. U.S. Patent Application U.S. 2002/0131835A1 is a further refinement of the '925 patent, in which hole saw cups of various diameters and having different sized attachment bores may readily be interchangeably mounted on a single-ended arbor-holder by a twisting, snapping action.

The prior art addressing roof core cutters has concentrated on manual core drilling apparatus. The Red Dragon CC 501 Core Cutter made and sold by Flame Engineering is such a manual core cutter capable of extracting a 2 inch diameter by 7 inch sample. Not adapted to be used in conjunction with a drill motor, the 501 Core Cutter is turned by hand.

The problem of adapting manual roof core cutters to operate with a drill motor has not been adequately addressed. Not having a pilot bit to guide the saw at the beginning of the operation, a drill motor would be difficult to use safely. In addition, the torque generated by a general purpose drill motor may be insufficient to overcome the binding resistance generated by several inches core material. None of the above inventions and patents, taken either singularly or in combination, is seen to describe the instant invention as claimed. Thus a roof core cutter solving the aforementioned problems is desired.

SUMMARY OF THE INVENTION

The present invention is a roof core-drilling apparatus and drilling guide adapted to be used in combination with a rotary drive means in which the mandrel portion of the invention operates not only to mechanically transfer rotational power from the rotary drive means to the cutting teeth during the drilling operation, but also as a plunger for ejecting the core of work material from the saw body when the drilling operation is completed. Accordingly, it is a principal object of the invention to provide a roof core cutter having core-ejection capability adapted to operate with a rotary drive.

It is another object of the invention to provide a core cutting guide that would provide for safe operation of the roof core cutter under high speed motor driven operation.

It is a further object of the invention to provide a roof core cutter that would provide for easy ejection of the core material from the saw body.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
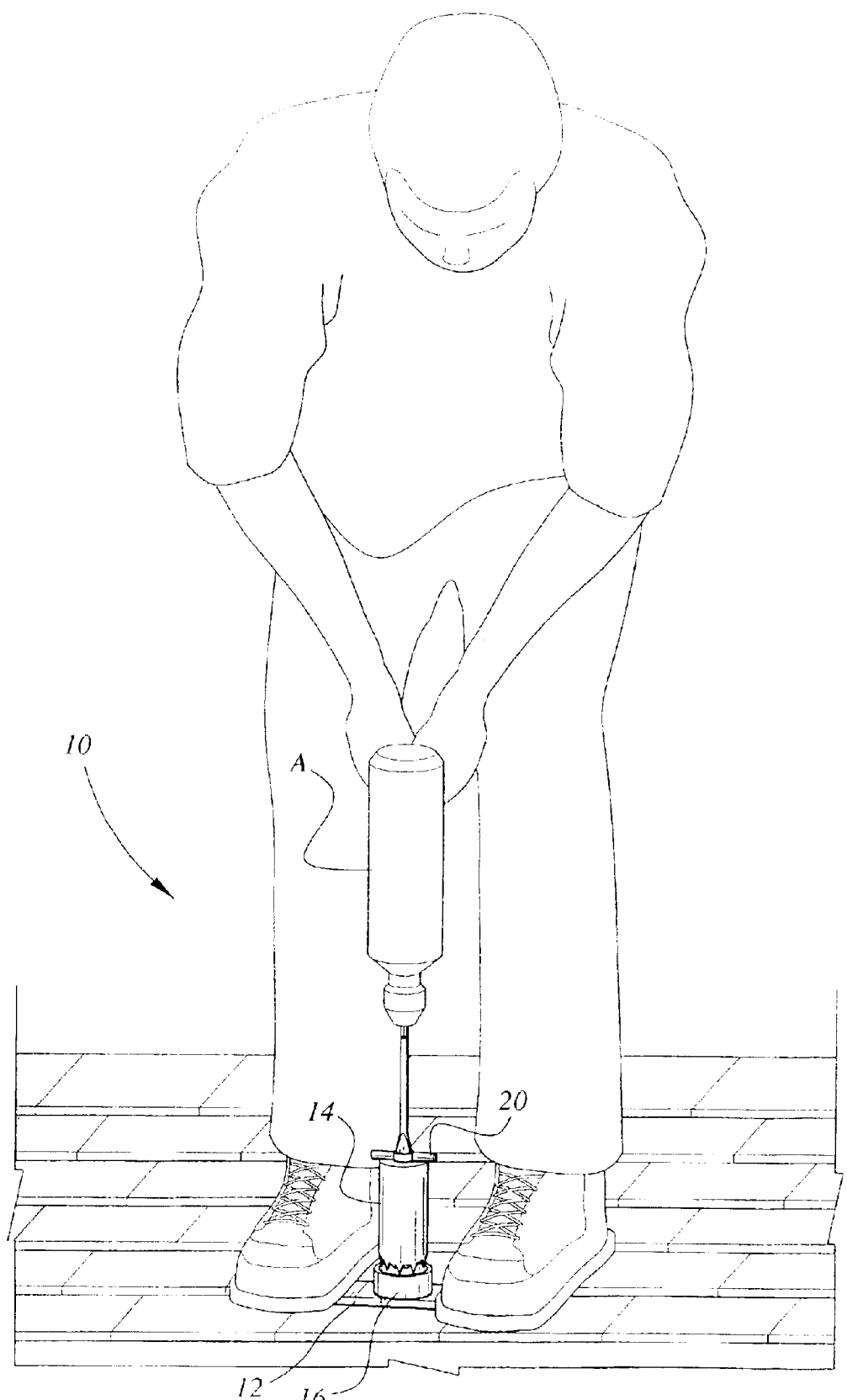
FIG. 1 is an environmental, perspective view of a roof core cutter according to the present invention.

FIG. 1 illustrates the roof-core cutter 10 in operation. A user standing on the core-cutting guide 12 directs the saw body 14 through the cylindrical opening 16 in the core-cutting guide 12. The core-ejecting mandrel 18, rotatably coupled to the saw body 14 through the mandrel nut 20 delivers rotational power to the saw body 14 through the rotary drive mechanism A.

Figure 2:
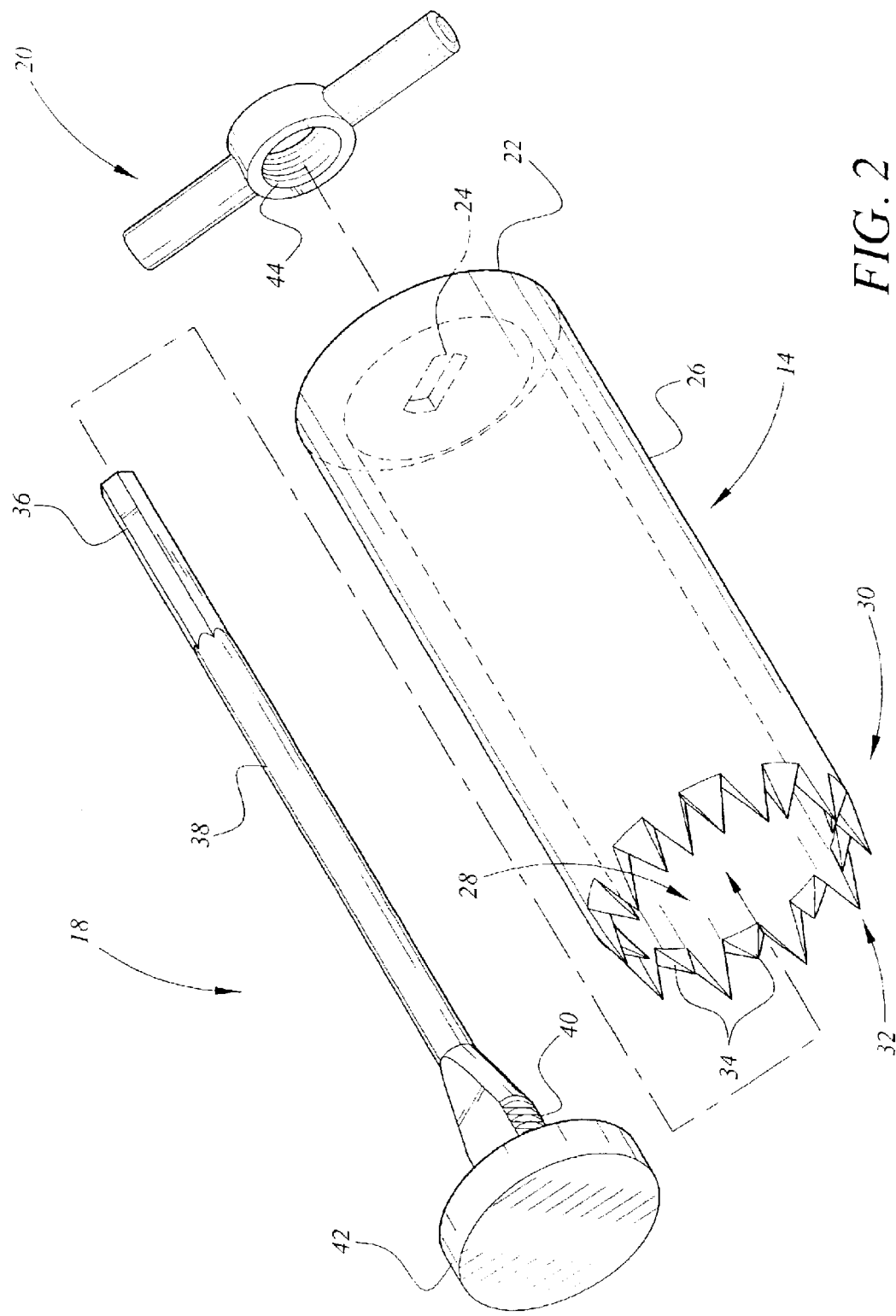
FIG. 2 is an enlarged-scale, perspective view of the roof core cutter shown in FIG. 1.

FIG. 2 illustrates the core-ejecting mandrel 18 slidably received by the saw body 14 and secured in place by mandrel nut 20. The saw body 14 is comprised of a base end 22 having through its thickness dimensioned a non-circular axial aperture 24, a side wall 26 extending from the base end 22 defining an interior cavity 28, an outer edge 30 and a plurality of cutting teeth 32 formed on the outer edge 30. The saw body 14 in its present embodiment is made of steel and has a length of about 7¼ inches and an outside diameter of 1¾ inches.

To facilitate the removal of the core after operation of the roof core cutter 10, every other tooth 34 is angled slightly towards the center of the saw body 14 so as to cut a core with a diameter slightly less than the inner diameter of the saw body 14. Slidably received by the saw body 14 through the non-circular aperture 24 in the base 22 is the core ejecting mandrel 18 made of steel and having a length of about 8¼ inches. The mandrel 18 is comprised of a hexagonal proximal end 36 which is inserted into a rotary drive mechanism A, an elongated shaft 38 connecting the proximal end 22 to a non-circular threaded shoulder portion 40 terminating in a core-ejecting flange 42 on the distal end of the mandrel 18 having a diameter slightly less than that of the inside diameter of the saw body 14 adapted to slide within the saw body 14. When inserted into the saw body 14, the core-ejecting flange 42 abuts the base 22 of the saw body 14 and a mandrel nut 20, with internal right-handed threads 44, receives the threaded shoulder 40 of the mandrel 18, rotatably coupling the saw body 14 to the mandrel 18.

Figure 3:
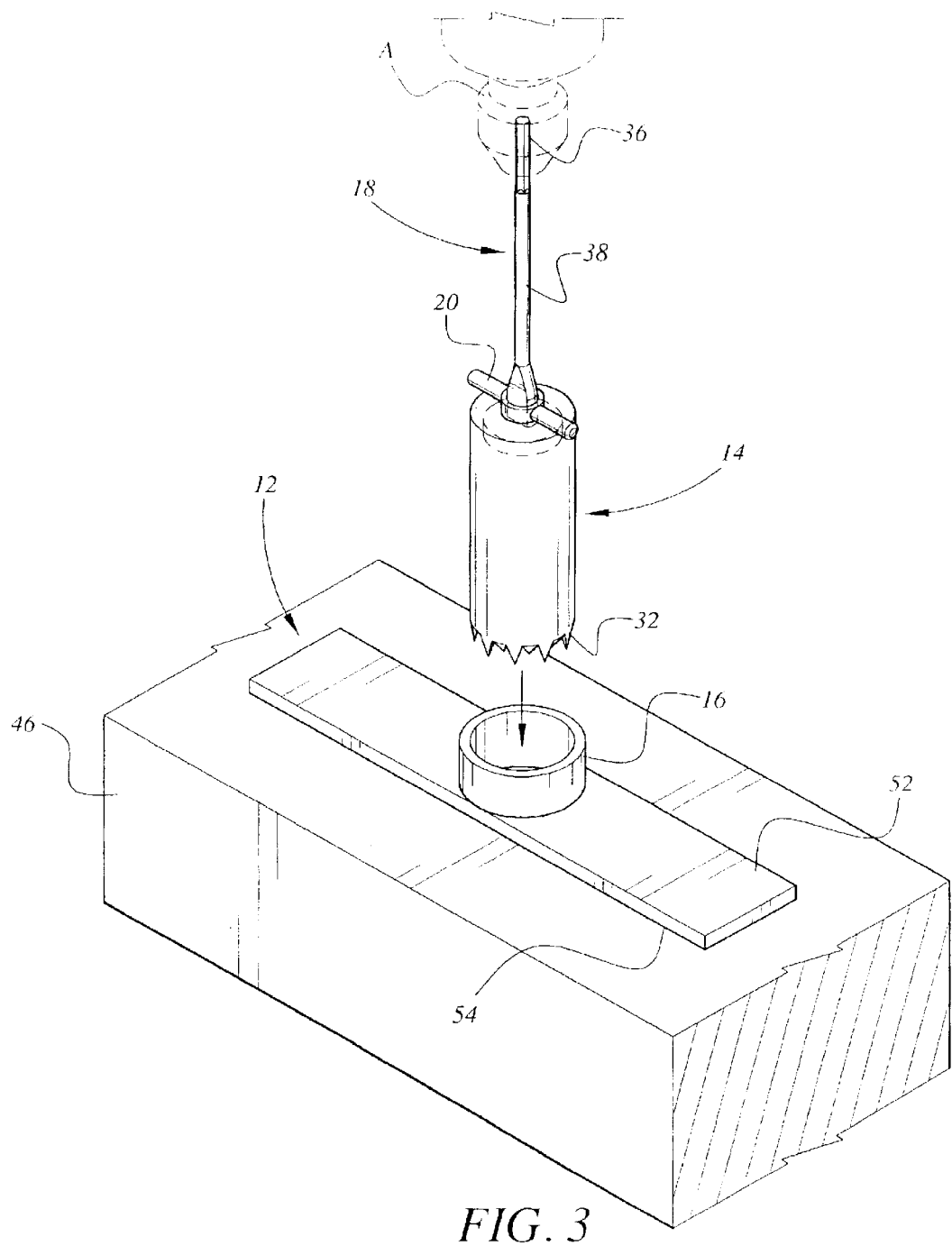
FIGS. 3, 4 and 5 are environmental, perspective views of the roof core cutting apparatus in operation.
Figure 4:
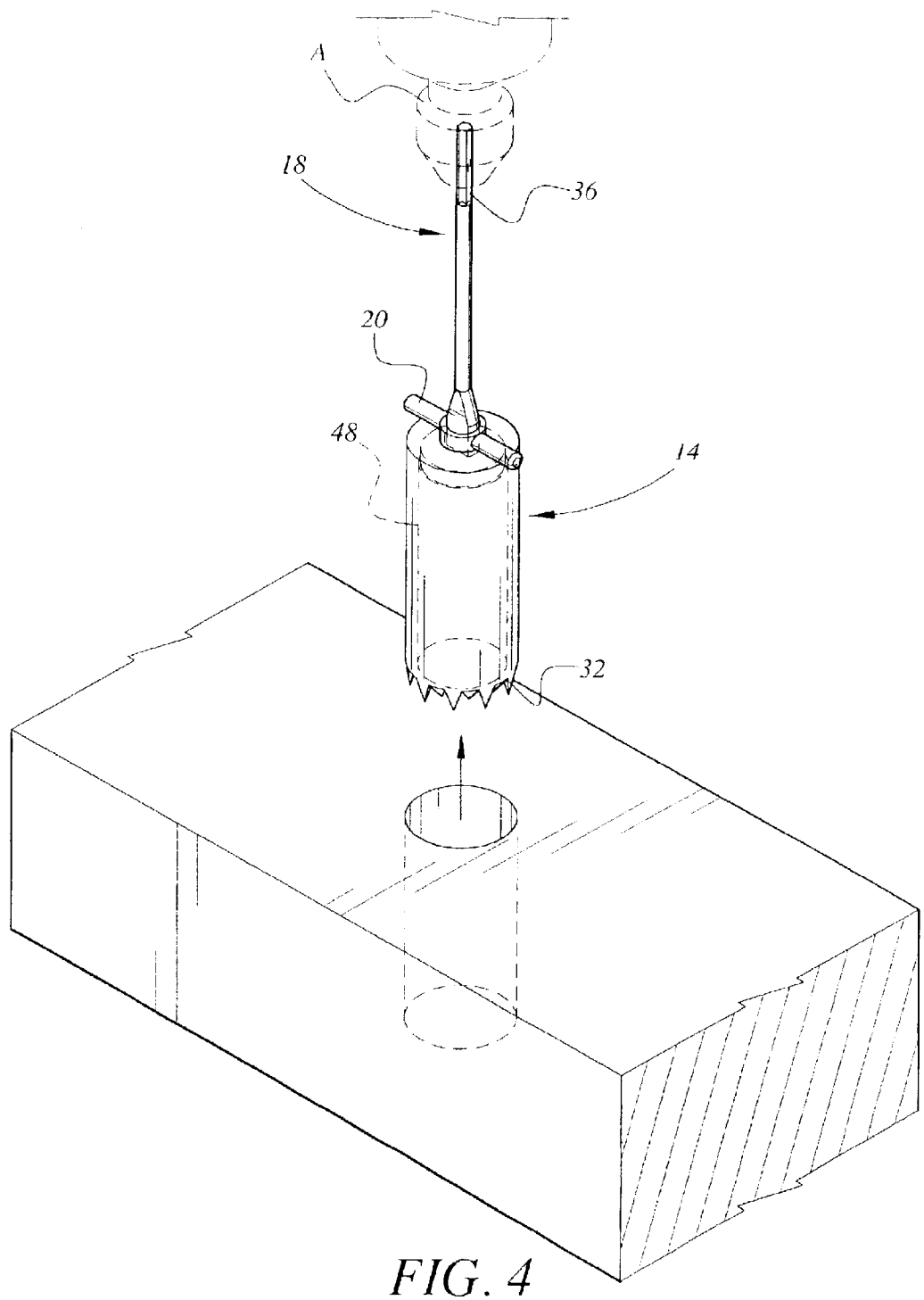
Figure 5:
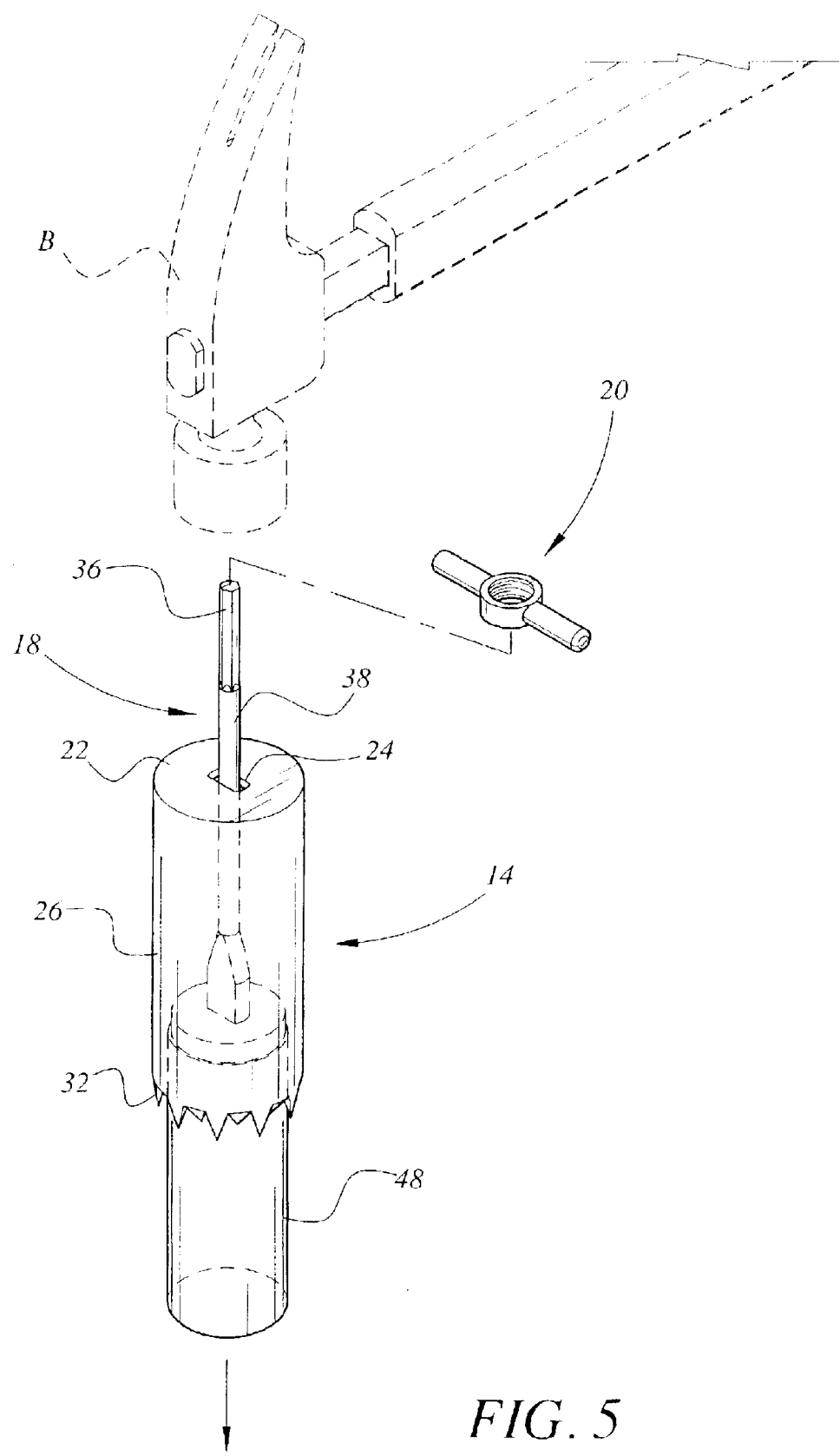

FIGS. 3, 4 and 5 illustrate the operation of the roof core cutter 10 to cut a core of work material from a work surface 46 and subsequently eject the core from the saw body 14. As shown in FIG. 3, the saw body 14 is mounted to the mandrel 18 which is rotatably coupled to the rotary drive mechanism A. The saw body 14 is slidably received and guided by the core cutting guide 12, the guide comprising a substantially rectangular platform 50 having an upper 52 and lower surface 54, a circular bore 16 centrally disposed within the platform 50 and a raised cylindrical lip 54 disposed on the upper surface circumscribing the circular bore 16, the inner diameter of the circular bore 16 and cylindrical lip 54 being slightly larger than the outer diameter of the saw body 14 so as to slidably receive the saw body 14. The core cutting guide 12 is placed on the roof or other work surface 46 to be bored, with the lower surface 54 in contact with the work surface 46. The operator stands upon the upper surface 52 and the cylindrical lip 54 functions to guide the cutting teeth 32 when engaging the work surface 48.

FIG. 4 illustrates the core of work material retained in the cavity of the saw body after being cut from the work surface after operation of the core cutter 10.

FIG. 5 illustrates the removal of the core of work material from the saw body 14 after removal of the mandrel nut 20. A hammer B or other force applying means may be used to apply sufficient force to the proximal end 36 of the core-ejecting mandrel 18 to remove the core of work material from the interior cavity 28 of the saw body 14.

From the foregoing, those skilled in the art will appreciate that the roof core cutter and guide according to the invention is easy to use and inexpensive to manufacture. It is to be understood that the present invention is not limited to the embodiment described above, but encompasses any and all embodiment within the scope of the following claims.

I claim:

1. A roof core cutter comprising:

(a) a saw body having a base end having through its thickness dimensioned a non-circular axial aperture, a side wall extending from the base end defining an interior cavity, an outer edge and a plurality of cutting teeth formed on the outer edge;

(b) a core ejecting mandrel having a proximal end adapted to be rotatably coupled to a rotary drive means, an elongated shaft, a right-hand threaded non-circular shoulder portion and a distal outwardly extending core-ejecting flange;

(c) a mandrel nut having internal right-hand threads; and (d) means for guiding the roof core cutter in the controlled cutting of work material when the roof core cutter is rotatably coupled to a rotary drive means;

wherein the proximal end of the core-ejecting mandrel is slidably received by the saw body such that the non-circular threaded shoulder extends through the non-circular aperture in the base of the saw body and is threadedly received by the mandrel nut, securing the core-ejecting flange against the base of the saw body;

whereby the mandrel nut, core-ejecting mandrel, and saw body cooperate to couple rotational power from the mandrel to the saw body when a rotary drive means, secured to the proximate end of the mandrel, operates to advance the saw body through a workpiece.

2. The core cutter according to claim 1, wherein the plurality of cutting teeth is further defined by a pattern of alternating teeth, the pattern consisting of a first tooth extending in a longitudinal axis in the same plane as the saw body followed by a second tooth extending inward from the side wall towards the center of the saw body such that the inner diameter of the cutting teeth formed by the inwardly angled teeth is slightly less than the inner diameter of the saw body.

3. The core cutter according to claim 1, wherein the means for guiding the core cutter is comprised of a substantially rectangular platform having an upper and lower surface, a circular bore centrally disposed within the platform and a raised cylindrical lip disposed on the upper surface of the base circumscribing the circular bore, the inner diameter of the bore and lip being slightly larger than the outer diameter of the saw body so as to slidably receive the saw body.

* * * * *